United States Patent [19]

Buehl

[11] Patent Number: 6,099,727
[45] Date of Patent: Aug. 8, 2000

[54] PROCESS FOR REMOVING CONTAMINANTS FROM COOLING LUBRICANTS

[75] Inventor: Karl Heinz Buehl, Aachen, Germany

[73] Assignee: Filterwerk Mann & Hummel GmbH, Ludwigsburg, Germany

[21] Appl. No.: 09/105,272

[22] Filed: Jun. 26, 1998

[30] Foreign Application Priority Data

Jun. 28, 1997 [DE] Germany .................. 197 27 618

[51] Int. Cl.[7] .................................. B01D 21/00
[52] U.S. Cl. ................... 210/254; 196/46.1; 196/98; 210/787; 210/175; 210/259
[58] Field of Search .................. 210/787, 175, 210/254, 259; 196/46.1, 98

[56] References Cited

U.S. PATENT DOCUMENTS 4,938,876  7/1990  Ohsol ........................... 210/708
5,269,906  12/1993  Reynolds et al. ............... 208/13

FOREIGN PATENT DOCUMENTS

| 4205884 | 9/1993 | Germany . |
| 2094082 | 1/1997 | Spain . |
| WO 94/21761 | 9/1994 | WIPO . |
| WO 95/14749 | 6/1995 | WIPO . |

Primary Examiner—Jill Warden
Attorney, Agent, or Firm—Evenson, McKeown, Edwards & Lenahan, P.L.L.C.

[57] ABSTRACT

A method for separating impurities from cooling lubricants, in particular oil or oil emulsions, in which the cooling lubricant first is warmed to decrease the viscosity; then it is centrifuged in a centrifuge, after which the cleaned cooling lubricant passes to a cooling system in which it is adjusted back to normal temperature or to the required viscosity.

5 Claims, 2 Drawing Sheets

PROCESS FOR REMOVING CONTAMINANTS FROM COOLING LUBRICANTS

BACKGROUND OF THE INVENTION

This invention relates to a method for the separation of contaminants from cooling lubricants.

In the machining industry, when dry machining is not possible, oil or an oil-water mixture, preferably an emulsion, is used for lubricating and cooling the machine tools. This cooling lubricant also serves to carry the chips away to a filter system. There the chips and the cooling lubricant are substantially separated, the chips are discarded, and the substantially cleaned cooling lubricant is returned to the work process at the cutting edge of the tool.

The drive toward increasing productivity is leading, due to further improvements in tool systems, to ever-increasing cutting speeds, longer useful tool life, and also to different forms of chips. The higher performance is likewise achieved only if oil is used as cooling lubricant, with a trend toward use of higher viscosity oils.

The demands placed on the filter system are likewise increasing due to these circumstances, which means that the fineness of filtration must become ever greater, and the residual dirt content in the oil on the clean side of the filter must be reduced even further. There are filter systems which achieve these goals, but they use a filter aid for filtration, which involves purchasing and disposal costs.

Furthermore, especially in the case of new purchases, the basic rule is to give priority to reducing waste over waste disposal.

In the machining of gray cast iron, aluminum and magnesium, however, when oil is used as the cooling lubricant, the fine contaminant particle content constantly increases, especially particles having a size below about 15 $\mu$m. In the case of gray iron, the graphite content predominates, and in the case of aluminum and magnesium, the predominant portion of the fine contaminants comprises extremely fine chips.

If precoated filters are not used as the primary stream filters, the ever-increasing content of fine debris in the cooling lubricant leads to clogged supply lines, sticking slides and internal walls of the machinery, plus the danger of fire in the machining of magnesium, and also the failure of internally cooled tools.

Certain filter methods also suffer from clogging by fine debris, and require ever-increasing maintenance costs.

In practice, attempts have been made to reduce this clogging at least to a supposedly tolerable level by the use of additional filters in a secondary circuit.

German Patent Application No. DE 4,205,884 discloses a method for separating dewatered waste oil in which the waste oil is said to be separated into medium-heavy mineral oils, heavy mineral oils, and solids. For this purpose the waste oil is introduced into a heating circuit, part of the waste oil is evaporated, and it is separated in a two-phase decanter into solids and into a centrifuged, clean heavy oil phase. A disadvantage of the process is high energy consumption. In the cleaning of cooling lubricants on a continuous basis, such a process is not economical.

Further, German Patent Application No. DE 4,343,609 discloses a method for processing cooling lubricants in which the cooling lubricants are heated, then decanted, and the recovered cooling lubricant is drawn off. The re-usable oil is processed by separation. This method also is characterized by a high energy consumption and is suitable only where a small amount of lubricant is to be cleaned.

SUMMARY OF THE INVENTION

It is the object of the invention to provide a process which is capable of handling a high throughput of cooling lubricants, that is, which is capable of filtering large amounts of cooling lubricants, with a low consumption of energy.

This and other objects of the invention are achieved by providing a process for removing contaminants from a cooling lubricant, said process comprising the steps of heating the cooling lubricant to decrease its viscosity, centrifuging the heated cooling lubricant to separate contaminant particles therefrom and obtain a cleaned cooling lubricant, and thereafter cooling the cleaned cooling lubricant.

A significant advantage of the invention is that the oil or cooling lubricant laden with fine contaminant particles is first warmed, then centrifuged, and then re-cooled. The combined warming and cooling can be achieved in an energy-saving manner by a simple heat pump process based on coupling the warming with the cooling. The appropriately selected centrifuge can dependably separate the fine particles in an unobjectionable form. By means of the warming, the viscosity of the cooling lubricant can be decreased to less than 10 centistokes (cSt).

In accordance with one embodiment of the invention, the centrifugation of the cooling lubricant is performed in a bypass stream. In the primary stream, the coarse particles can be separated by a filter element or a coated filter.

It is also possible to centrifuge the cooling lubricant in the primary stream by making the apparatus for the carrying out the process of an appropriate size. In this case both the coarse and the fine particles are separated in the centrifuge.

As already mentioned, the warming and cooling of the lubricant can be achieved in an energy-saving manner by means of a heat-pump process. Of course, it is also possible to warm and cool the cooling lubricant by means of conventional heating systems.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be explained in further detail hereinafter with reference to illustrative preferred embodiments shown in the accompanying drawings, in which.

DETAILED DESCRIPTION OF PREFERRED EMBODIMENTS

Figure 1:
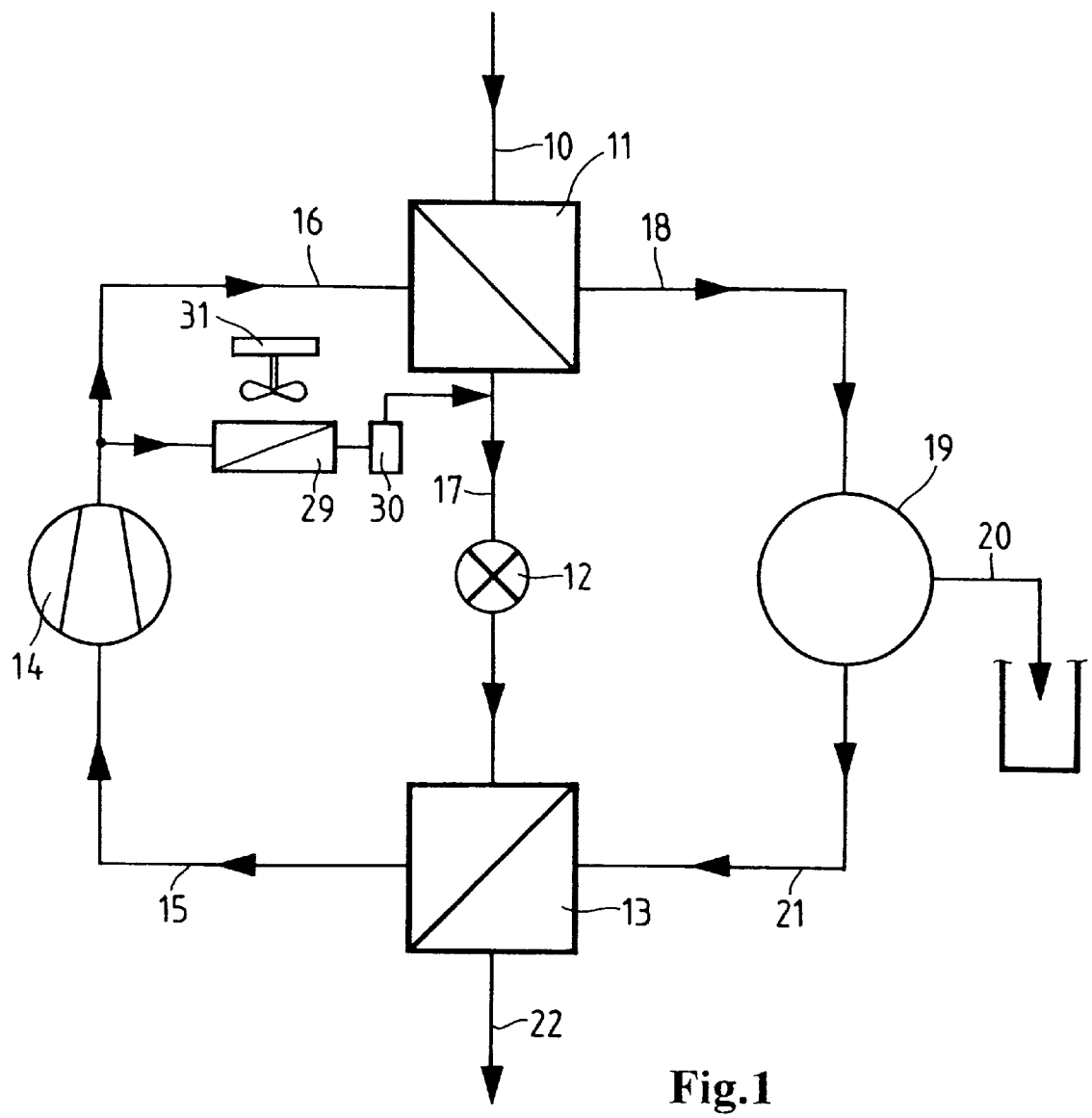
FIG. 1 is a schematic drawing of an apparatus for carrying out the process of the invention for the separating contaminants from cooling lubricants.

The apparatus of FIG. 1 is supplied through line 10 with contaminated cooling lubricant, in particular dirty oil. The dirty oil goes to a condenser 11; this condenser 11 is part of a heat pump which also comprises an expansion valve 12, an evaporator 13, a compressor 14, and lines 15, 16, 17 for the heating medium. A cooler is provided in line 16 between compressor 14 and condenser 11; this cooler 29 has a fan 31 and cools a partial stream of the heating medium. The amount or volume of the partial stream is controlled through the valve 30. In the condenser 11 the dirty oil is warmed and passes through the line 18 to a centrifuge 19. Here, depending on the construction of the centrifuge, fine contaminant particles are discharged as an unobjectionable solid sludge or highly concentrated oil sludge. Discharge takes place through the sludge outlet 20. The cleaned oil passes as clean oil through line 21 to the evaporator 13, is cooled therein and leaves the apparatus through line 22 and can be delivered from there to the machine tool or processing machine to be used as a cooling lubricant.

Figure 2:
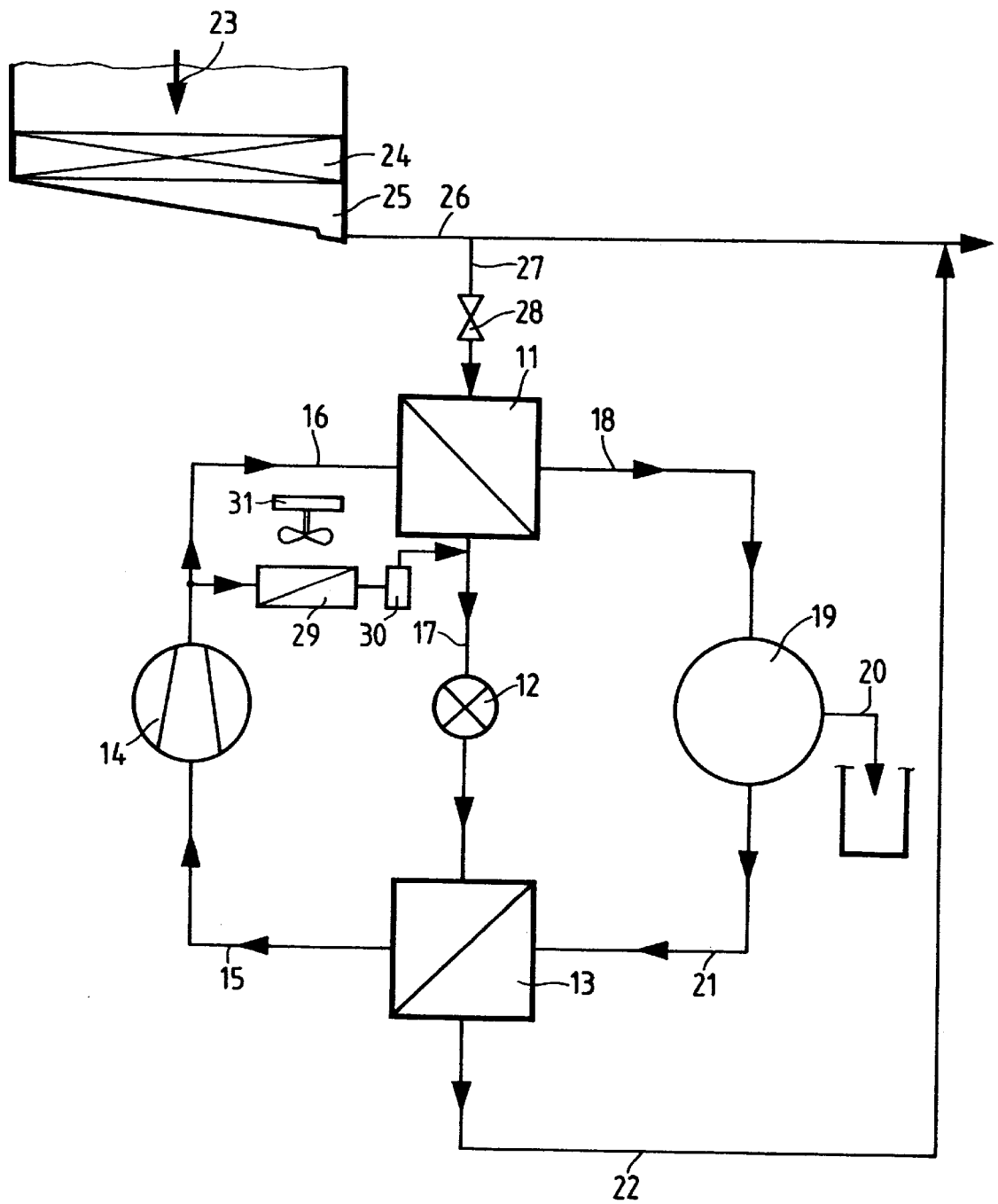
FIG. 2 is a representation of an apparatus corresponding to FIG. 1 installed in a bypass line of a filter system.

FIG. 2 shows an apparatus like the one in FIG. 1 in a bypass circuit; corresponding parts are identified by corresponding reference numbers. Dirty oil passes through line 23 to a filter system 24. In this filter system the coarse particles are filtered out, the oil still laden with fine particles collects in the sump 25 and flows from there into line 26. A large part of the cleaned oil is passed directly to the machine tools. A bypass stream passes through line 27 and valve 28 to the apparatus described in FIG. 1, where it is heated, centrifuged and then re-cooled; it leaves the process as clean oil through line 22 and is mixed with the coarsely cleaned coolant liquid. It is also possible to use the centrifuged oil directly as a working fluid wherever high purity is required, while the coarsely cleaned oil can be used in accord with its degree of cleanliness. Basically, the oil laden with dirt or contaminants is fed back to the filter system 24 through line 23.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. Apparatus for separating impurities from a cooling lubricant, said apparatus comprising:
    a heat pump receiving said cooling lubricant containing said impurities, said heat pump including a condenser, an evaporator and a compressor, wherein said condenser reduces the viscosity of said cooling lubricant containing said impurities by heating said cooling lubricant containing said impurities; and
    a centrifuge receiving said heated lubricant from said condenser and cleaning said lubricant to provide a cleaned lubricant to said evaporator wherein said cleaned lubricant is cooled by said evaporator;
    wherein said cooling lubricant is divided into a primary stream and a bypass stream, and said centrifuge is positioned in said bypass stream; and
    further comprising a coarse filter element positioned in said primary stream to provide a coarse filtration.

2. The apparatus according to claim 1, wherein said cooling lubricant is an oil or an oil emulsion.

3. The apparatus according to claim 1, further comprising another centrifuge positioned in said primary stream.

4. The apparatus according to claim 1, wherein said evaporator transfers heat to the condenser when said cleaned lubricant is cooled by said evaporator.

5. Apparatus for separating impurities from a cooling lubricant, said apparatus comprising:
    a heat pump receiving said cooling lubricant containing said impurities, said heat pump including a condenser, an evaporator and a compressor, wherein said condenser reduces the viscosity of said cooling lubricant containing said impurities by heating said cooling lubricant containing said impurities; and
    a centrifuge receiving said heated lubricant from said condenser and cleaning said lubricant to provide a cleaned lubricant to said evaporator wherein said cleaned lubricant is cooled by said evaporator;
    wherein said cooling lubricant is divided into a primary stream and a bypass stream and wherein said condenser, said centrifuge and said evaporator are positioned on the bypass stream:
    further comprising a coarse filter element positioned in said primary stream to provide coarse filtration.

* * * * *